No. 835,271. PATENTED NOV. 6, 1906.
H. ADLER.
CURTAIN STRETCHER.
APPLICATION FILED OCT. 12, 1905.
3 SHEETS—SHEET 2.
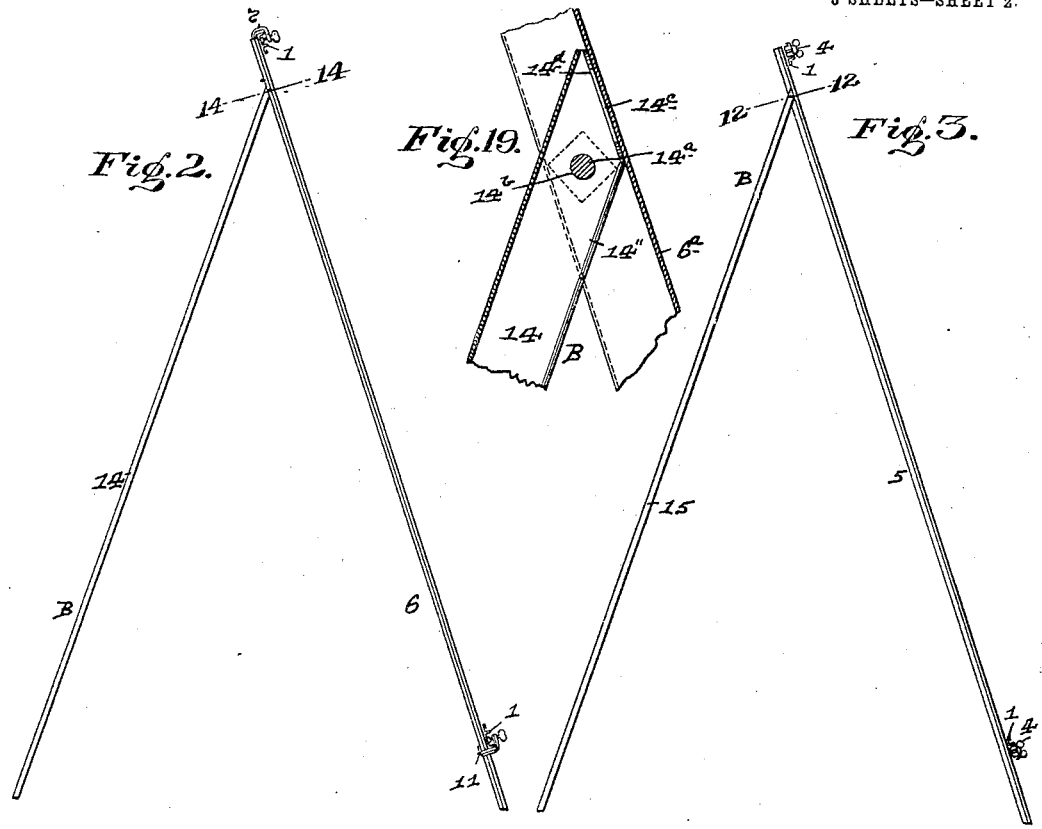
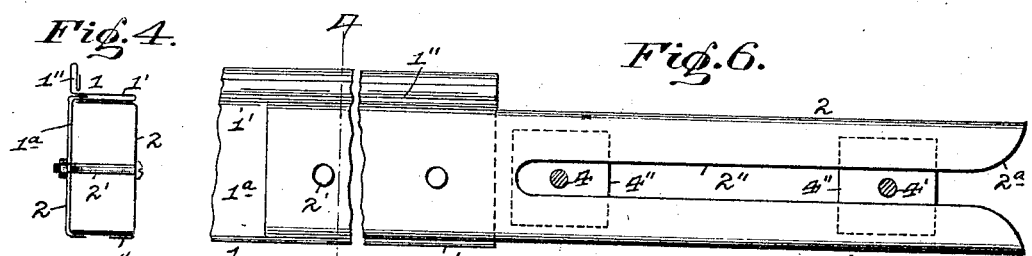
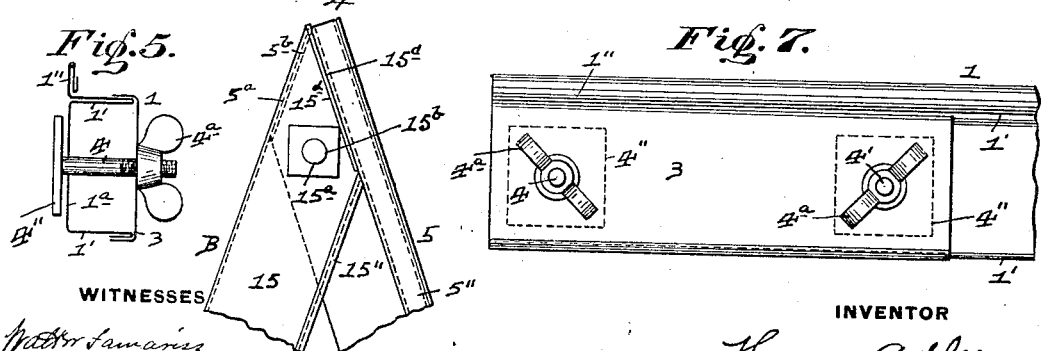
WITNESSES
INVENTOR
Henry Adler,
By J. N. Cooke,
Attorney

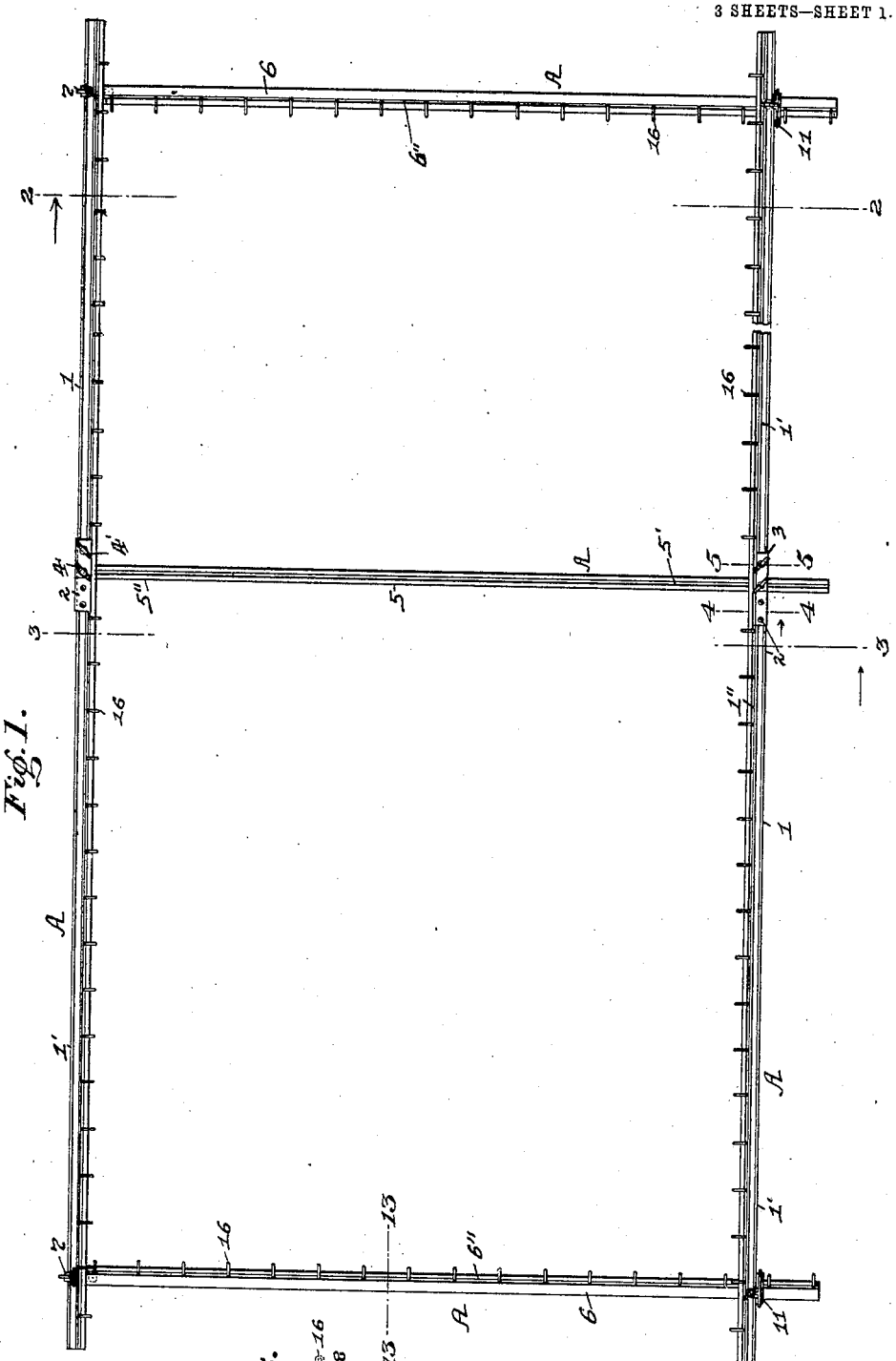

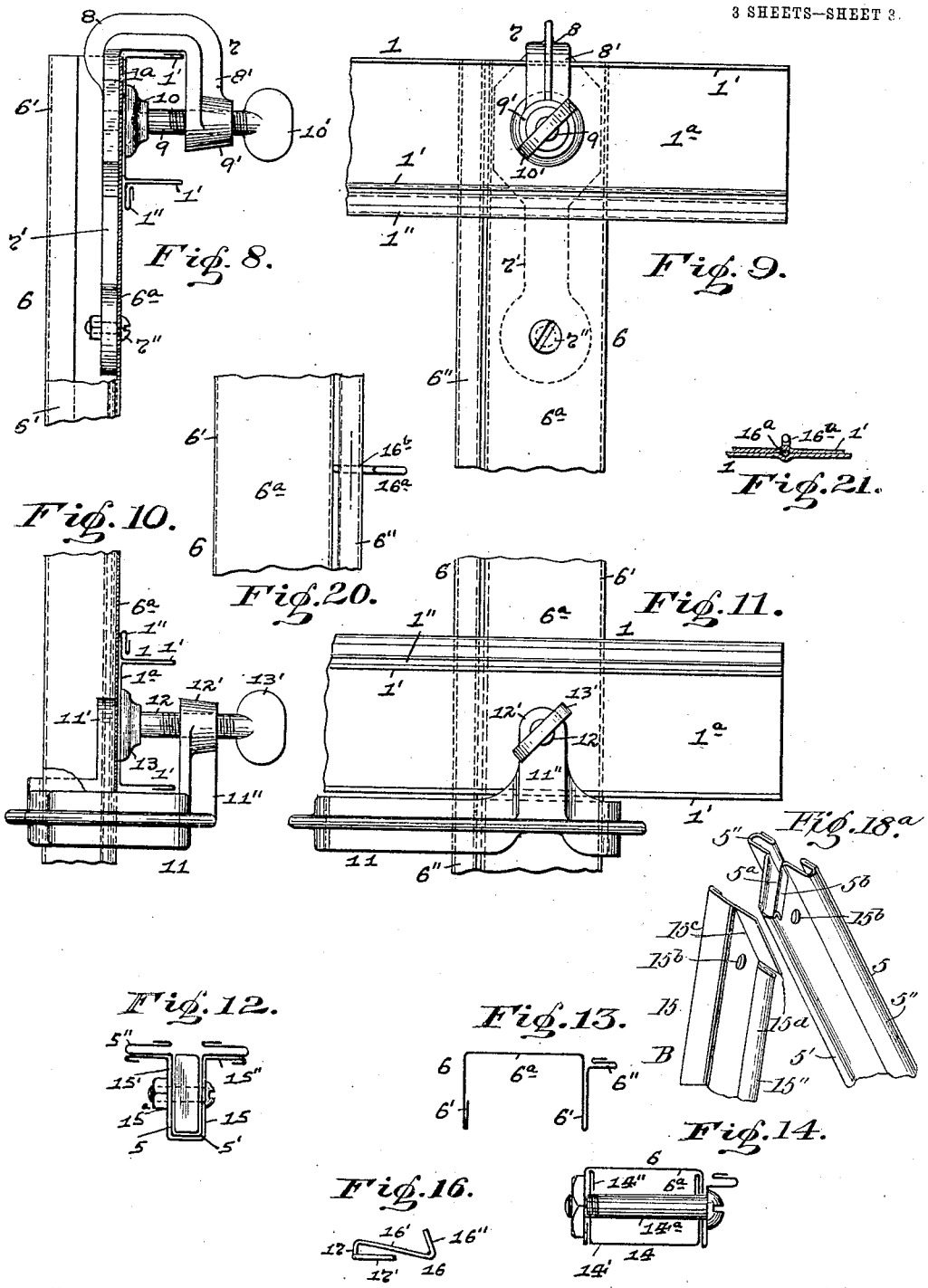

UNITED STATES PATENT OFFICE.

HENRY ADLER, OF PITTSBURG, PENNSYLVANIA, ASSIGNOR TO H. ADLER COMPANY, INCORPORATED, OF PITTSBURG, PENNSYLVANIA, A CORPORATION OF PENNSYLVANIA.

CURTAIN-STRETCHER.

No. 835,271.  Specification of Letters Patent.  Patented Nov. 6, 1906.

Application filed October 12, 1905. Serial No. 282,383.

*To all whom it may concern:*

Be it known that I, HENRY ADLER, a resident of Pittsburg, in the county of Allegheny and State of Pennsylvania, have invented a new and useful Improvement in Curtain-Stretchers; and I do hereby declare the following to be a full, clear, and exact description thereof.

My invention relates to curtain-stretchers, and has special reference to metallic stretchers for curtains, &c.

The object of my invention is to provide a cheap, simple, and effective curtain-stretcher from sheet metal in which the parts can be easily and quickly set up for use and separated, as well as one which can be easily and rapidly manufactured and will be light in weight and strong and durable when in use.

My invention consists, generally stated, in the novel arrangement, construction, and combination of parts, as hereinafter more specifically set forth and described, and particularly pointed out in the claims.

To enable others skilled in the art to which my invention appertains to construct and use my improved curtain-stretcher, I will describe the same more fully, referring to the accompanying drawings, in which—

Figure 1 is a plan or side elevation of my improved curtain-stretcher. Fig. 2 is a cross-section on the line 2 2, Fig. 1, showing the frame open. Fig. 3 is a like view on the line 3 3, Fig. 1. Fig. 4 is an enlarged cross-section on the line 4 4, Figs. 1 and 6, showing the connection between the side rails. Fig. 5 is a like view on the line 5 5, Fig. 1, at another point of said connection. Figs. 6 and 7 are enlarged side elevations showing the end connections for said rails. Figs. 8 and 9 are enlarged end and face views, respectively, of the clamping connection between the upper side and end rails. Figs. 10 and 11 are like views of the lower side and end rails. Fig. 12 is a cross-section on the line 12 12, Fig. 3. Fig. 13 is a cross-section on the line 13 13, Fig. 1. Fig. 14 is a cross-section on the line 14 14, Fig. 2. Fig. 15 is a sectional view showing the manner of holding the pins in the rails. Fig. 16 is a side view of one of the attaching hooks or pins. Fig. 17 is a plan view of the same. Fig. 18 is a side view of the pivotal connection between the middle rail and leg. Fig. 18$^a$ is a perspective view of the same and showing the rail and leg separated. Fig. 19 is a sectional view of the pivotal connection between the end rail and leg. Figs. 20 and 21 are views showing another form of hook and connection.

Like symbols of reference herein indicate like parts in each of the figures of the drawings.

As illustrated in the drawings, A is the frame of the stretcher, of which 1 represents the two side rails or pieces, which are each formed from a piece of thin sheet metal and bent to form a channel shape in cross-section, having a body 1$^a$, the doubled flanged side edges 1', and a slotted portion 1'', extending out from the inner side of said flanged edges. The side rails 1 are made in two sections or portions and are connected together at their ends by extensions 2, connected by bolts 2' to one of said ends on one of said portions and on each side of the same and each formed of a thin piece of sheet metal which is bent to form a channel shape of said side-rail portion to be secured thereto by said bolts, while one side edge of the inner extension fits within the groove formed by the doubled flanged edges 1, of said side-rail portion adjacent to the wing portion 1'', and the other side edge of the same fits around the opposite doubled flanged edge of said rail. The body portions of said extensions 2 beyond said rail are each provided with a slot 2'' therein, which terminates at its outer end by the rounded edge 2$^a$. A clamping-piece 3, of sheet metal, formed in like manner and shape, fits around the flanged side edges 1' of the end of the other side-rail portion 1, and such piece 3 carries the bolts 4 4', which pass through said piece and rail portion through the slots 2'' in the extensions 2 and have the head-plates 4'' on their rear ends adjacent to the body of said rail portion, while the front ends of said bolts have the thumb-nuts 4$^a$ thereon, as shown in Figs. 4 to 7. A center or intermediate rail 5, of sheet metal, for the frame A is formed in like manner and of a shape with a grooved central portion 5' and grooved wing portions 5'', extending out at right angles from the sides of said grooved portion 5', so that such rail 5 can be connected to the side rails 1 by the head-plates 4'' on the bolts 4 adjacent to the bolts 2', fitting within said grooved wing portion 5'', and such rails secured together by screwing up the nuts 4ª on said bolts 4, as shown in Figs. 5 and 12. Both the bolts 4 and 4' when screwed up hold the sections or portions of the side rails 1 together and the middle rails 5 to said side rails, as stated above, although the lower side rail can be adjusted along said middle and end rails 6, as hereinafter described.

The two end rails or pieces 6 of the frame A are each formed from a piece of thin sheet metal and bent to form a channel shape, like the side rails 1, having body 6ª, the doubled flanged side edges 6', and the slotted portions 6'', extending out from the inner side of said flanged edges. The upper ends of the end rails 6 are provided with the clamps 7, which are provided with the securing or body portion 7' thereon for fitting within the channel on the rear of said rails and for being connected to said rails by the screw-bolt 7'', while from said body portion 7' and extending around the upper end of said rails is an arm 8, which has a depending portion 8' for projecting down in front of said end rails and upper side rail, so that said upper side rail can be inserted within and through said clamps 7 and be secured to said end rails by means of a thumb-screw bolt 9, passing through a threaded bearing 9' at the end of said depending portion. These bolts 9 have a swiveled cap or head 10 at their inner ends for engaging with the upper side rail 1 and within the channel thereof, while the outer ends of said bolts are provided with a thumb-piece 10' thereon for operating the same, as shown in Figs. 8 and 9. The end rails 6 are also provided with the clamps 11 for holding and adjusting the lower side rail 1 in conjunction with the bolt 4 on said rail 1, connecting the middle rail 5, and these clamps fit around said end rails, as shown in Figs. 10 and 11. A sliding or guiding portion 11' is formed on said clamps 11 for fitting within the channel of the end rails 6 and against the body 6ª thereof, and an upwardly-extending arm 11'' is formed on the front of said clamps, so that the lower side rail 1 can be inserted within and through said clamp and be secured and adjusted to said rails 6 by means of a screw-bolt 12, passing through a threaded bearing 12' on the end of said arm. These bolts 12 have a swiveled cap or head 13 at their inner ends for engaging with the lower side rail 1 and within the channel thereof, while the outer ends of said bolts are provided with a thumb-piece 13' thereon for operating the same in securing and adjusting the said lower side rail to and along said end rails.

The frame A is provided with the end legs 14 and center leg 15, which act as a support or easel B, with the rails 6 and 5 for setting said frame in an inclined position, as shown in Figs. 2 and 3, and these legs are each formed from a piece of thin sheet metal and bent to shape in like manner as the rails of the frame. The end legs 14 are formed in channel shape, having a body portion 14' and doubled flanged side edges 14'', so that such legs can fit within the end rails 6 of the frame A, as shown in Fig. 14, with their body portions 14' resting against the body portions 6ª of said end rails when the said legs and rails are closed together, and such legs and rails are detachably connected together by means of a screw-bolt 14ª, passing through the flanged sides 14'' and 6' of said legs and rails, respectively, which bolt also permits the pivoting or hinging of said legs to said rails for the opening and closing of the same. The center or intermediate leg 15 is formed in such shape as to fit around the middle rail 5 of the frame A, as shown in Fig. 12, and it has a central grooved portion 15' for fitting around the grooved portion 5' of said rail and flanged wing portions 15'' on each side of said portion 15' for fitting against the grooved wing portions 5'' on said rails when the said leg and rails are closed together, and such leg and rails are detachably connected together by means of a screw-bolt 15ª, passing through the sides of said legs and rail, which bolt also permits the pivoting or hinging of said leg to said rail for the opening and closing of these parts.

The curtain-attaching pins are shown at 16 in Figs. 14 and 15 and are formed from wire and bent to the shape shown, in which there is a main portion 16' and from one end of which is the outer attaching portion 16'', which is bent back and extends above and at an angle to said body portion for a short or sufficient distance. The other end of the body portion 16' is bent downwardly at right angles to said body portion 16', as at 17, and then such end is bent around and under said body portion to form the triangular portion 17', having the slightly-inclined rear portions 17''', connecting such downwardly-extending portion 17. These pins 16 are placed within the slots of the slotted portions 1'' and 6'' of the rails 1 and 6, respectively, and are of such a shape and size that the apex of the triangular portion 17' will fit snugly against the outer end walls of said slotted portions, while the vertical end portion 17 thereon, connecting the main portion 16' with the triangular portion 17', will fit snugly against the side walls of said rails, forming the channel-sections thereof. This will permit the holding of the pins 16 in a placed or set position and will also enable them to be easily pushed along by hand to any position desired on account of the outer ends of the inclined rear portion 17'' being normally a slight distance away from the side walls of said rails, although to prevent their possible falling out of the slotted portions 1'' and 6'' in the rails 1 and 6, respectively, an ordinary cotter-pin 18 is removably secured in the ends of the said rails, as shown in Fig. 15.

The manner of assembling and using my improved curtain-stretcher is as follows: In practice the stretcher is packed or shipped with the parts separated or detached, with the exception of the easel or supports B for the frame A, composed of the rails 5 and 6 and legs 15 and 14, respectively, which are connected together by the bolts $14^a$ and $15^a$, respectively, so that such rails and legs can be telescoped together, and in assembling the floor can be used, if desired, so that the two sections composing each of the side rails for the frame A with the pins 16 within the same can be placed or connected together by inserting the outer extension 2 on one end of one section to its position within the clamping-piece 3 on the end of the opposite rail-section and the side edges of the inner extension 2 within the groove of the doubled flange 1' and around the other flange 1', respectively, of said opposite rail-section. After this is done the middle rail 5, carrying its leg 14, can be connected to the rails 1, passing the head-plates 4" on the bolts 4 within the grooves of the wing portions 5" on said rail 5, and then by sliding the upper side rail 1 along said rails 5 and the lower side rail 1 along the same to their positions the said bolt and the bolts 4' can be screwed up tight to hold said rails 1 together and to the middle rail 5. The end rail 6, carrying their legs 15 and with the pins 16 within the same, can now be placed in position against the side rails 1 and be connected thereto by means of the clamps 7 and 11 and their clamping-bolts 9 and 12, respectively, the upper clamps 7 and their bolts 9 being carried by and at the upper ends of the rails 6 and the lower clamps 11 with their bolts 12 being separate from said rails, so that they can be placed around said rails for securing the rails 1 and 6 together and for adjusting the lower rail 1 along the rail 5 and rails 6. This adjusting can be accomplished by unscrewing the bolts 4 and 12 and sliding the lower rail 1 along the rails 5 and 6, which will allow the said rail 1 to slide and be held by the head-plates 4" on said bolt 4 within the grooved wings 5" on the rails and the rails 6 to slide through the clamps 11, so that when the lower rail 1 is in its proper position the bolts 4 and 12 can be again screwed up to hold the said rail 1 to the rails 5 and 6. The frame A being now attached to the easel or its supports B, the stretcher is ready for use, so that the legs 14 and 15 of said easel can be opened to set the frame at an inclined position, and the legs 14 are limited in such open movements by having their upper ends adjacent to and above its pivotal or hinged point $14^b$, formed by the bolt $14^a$, cut away on an upward incline from the doubled flanged side edges 14", as at $14^c$, and such side edges have their flanges on such inclined portion bent in, as at $14^d$, in order to come against the body $6^a$ of the rails 6 when opened. The leg 15 is also limited to the same degree of movement as the legs 14 by having its upper end adjacent to and above the pivotal or hinged point $15^b$, formed by the bolt $15^a$, cut away on an upward incline from the doubled flanged or wing portions 15", as at $15^c$, and such wing portions are bent out, as at $15^d$, in order to come against the wing portions 5" on the middle rail 5 in such opening movement, while the upper end of said rail 5 also has its central or body portion 5' inclined downwardly from the wings 5" thereon, as at $5^a$, and such inclined edge flanged, as at $5^b$, in order that such upper end can move within the leg 15 when such leg is opened out. After the legs 14 and 15, forming the easel B, are thus opened out the curtain or other article to be placed upon the stretcher can be connected at its edges to the attaching portions 16" of the pins 16 in the rails 1 and 6, and such pins, if necessary, can be adjusted within the slotted portions 1" and 6" of said rails by moving the same by the hand in case the curtain is worn at a point or you are unable to catch hold of the same at a certain point by the attaching portions 16" thereon.

If desired, the rails 1 and 6 can be provided with stationary hooks or pins of any desired shape, such as the pins $16^a$ shown in Figs. 20 and 21, and any such pins can be passed through holes $16^b$ in the grooved or slotted portions 1" and 6", respectively, of said rails and be securely held therein by bending or forcing down the said flanged portions around said pins, as shown in said Figs. 20 and 21.

It will be evident that the parts of the stretcher when not in use can be removed and folded away by simply unscrewing the screw-bolts 4 4' and bolts 9 and 12 of the clamps 7 and 11, so that the rail-sections 1 can be separated and the rail 5, with its leg 15, slid or removed therefrom and the rails 1 from the rails 6 within said clamps, after which the rails 5 and 6 can have their legs 15 and 14 fold or telescope over the same. This folding of the rails 5 and 6 of the frame, with their legs 15 and 14, will enable the other sections of the rails 1 to be placed together with such folded parts, so that the stretcher will be brought into a small space or compass for storing away when not in use and for shipping, all the parts being at the same time retained together.

The shape of the clamps for the lower side rail and the central groove in the middle rail will enable such side rail to be moved from the extreme bottom of the rails 5 and 6 to the top rail 1 and set at any position thereon, while the overlapping or clamping connection between the side rails will give a double strength at such joint when the parts are brought together by the bolts at this point, thereby preventing any sagging or bending of these rails at such joint and giving additional strength at the point where the greatest strain is had and the greatest support is needed.

The attaching-pins 16 are readily applied to the rails 1 and 6 by inserting the triangular portions 17' within the slotted portions 1'' and 6'' at the ends of said rails and sliding said pins along, so that each pin can be moved to its desired point and each pin can be adjusted and held without further attention from the operator and without any liability to slide or slip after an adjustment is once obtained, while at the same time such pin can be moved or slid along said slotted portions by the operator simply grasping the main portion 16' or attaching portion 16'' gently, and by a slight forward or backward movement of the same to allow one inclined or rear portion 17'' to assume a straight position with its slotted portion the pin can be slid along the same.

The parts composing my improved stretcher being formed of thin sheet metal will permit the same to be galvanized, or, if preferred, they can be formed of galvanized sheet metal, thereby enabling the frame and parts to be made more rigid and less liable to sag and bend, as well as preventing any injury to the curtains, &c., from rust, &c., which is further taken care of by the main portions of said hooks or pins carrying the engaging ends being made of sufficient length to keep the material of said curtain from contact with the parts of the frame.

Various modifications and changes in some of the parts and in the design of the parts of the stretcher may be resorted to without departing from the spirit of the invention or sacrificing any of its advantages.

What I claim as my invention, and desire to secure by Letters Patent, is—

1. A stretcher-frame comprising rails formed of sheet metal and bent to form channel shapes in cross-section having wings or extensions thereon for the curtain-attaching pins.

2. A stretcher-frame comprising rails formed of sheet metal and bent to form channel shapes in cross-section having slotted wings or extensions thereon for the curtain-attaching pins.

3. A stretcher-frame comprising rails formed of sheet metal and bent to form channel shapes in cross-section having their sides provided with wings or extensions thereon for the curtain-attaching pins.

4. A stretcher-frame comprising rails formed of sheet metal and bent to form channel shapes in cross-section having their sides provided with slotted wings or extensions thereon for the curtain-attaching pins.

5. A stretcher-frame comprising rails formed of sheet metal and bent to form channel shapes in cross-section having doubled flanged sides provided with wings or extensions thereon for the curtain-attaching pins.

6. A stretcher-frame comprising rails formed of sheet metal and bent to form channel shapes in cross-section having doubled flanged sides provided with slotted wings or extensions for the curtain-attaching pins.

7. In a stretcher-frame, the combination of side rails formed in sections and connected together, end rails, and an intermediate rail formed of sheet metal, said intermediate rail having wing portions thereon for engaging the side rails at the connecting-point to hold said side rails in position and permit the same to be moved along said rail.

8. In a stretcher-frame, the combination of side rails formed in sections, connections between said side-rail sections for holding the same together, end rails and an intermediate rail formed of sheet metal, said intermediate rail having wing portions thereon for engaging the said rail connections to hold the said side rails in position and permit the same to be moved along said rail.

9. In a stretcher-frame, the combination of side rails formed in sections and connected together by screw-bolts, head-plates on said screw-bolts, end rails, and an intermediate rail formed of sheet metal, said intermediate rail being adapted to be engaged by the head-plates on said bolts for holding said side rails in position and for permitting the same to be moved along said intermediate rail.

10. In a stretcher-frame, the combination of side rails formed in sections and connected together by screw-bolts, head-plates on said screw-bolts, end rails, and an intermediate rail formed of sheet metal, said intermediate rail having wing portions thereon for being engaged by the head-plates on said bolts to hold said side rails in position and to permit the same to be moved along said intermediate rail.

11. In a stretcher-frame, the combination of side rails formed in sections, clamping connections between said sections having slots therein, screw-bolts fitting within said slots for holding said rail-sections together, head-plates on said screw-bolts, end rails, and an intermediate rail formed of sheet metal, said intermediate rail being adapted to be engaged by the head-plates on said bolts for holding said side rails in position and for permitting the same to be moved along said intermediate rail.

12. In a stretcher-frame, the combination of side rails formed in sections, clamping connections between said sections having slots therein, screw-bolts fitting within said slots for holding said rail-sections together, head-plates on said screw-bolts, end rails, and an intermediate rail formed of sheet metal, said intermediate rail having wing portions thereon for being engaged by the head-plates on said bolts to hold said side rails in position and to permit the same to be moved along said intermediate rail.

13. A stretcher comprising a frame having its rails formed of sheet metal, and legs or supports formed of sheet metal pivoted to said rails and adapted to telescope therewith.

14. A stretcher comprising a frame having its rails formed of sheet metal, and legs or supports formed of sheet metal pivoted to said rails and bent to shape for telescoping with said rails and for being limited in their outward movements.

15. A stretcher comprising a frame having its rails formed of sheet metal, and legs formed of sheet metal and bent to shape for telescoping with said rails, said legs having their upper ends inclined for engaging with said rails to limit the outward movement of the same.

16. An attaching-pin for curtain-stretchers formed of bent wire and having a body portion provided with an attaching portion at one end of the same and a triangular-shaped portion at the opposite end thereof.

17. An attaching-pin for curtain-stretchers formed of bent wire and having a body portion provided with an attaching portion at one end of the same and a triangular-shaped portion at the opposite end thereof having inclined rear faces thereon.

18. An attaching-pin for curtain-stretchers formed of bent wire and having a body portion provided with an attaching portion at one end of the same and a triangular-shaped portion at the opposite end thereof, said triangular-shaped portion being provided with inclined rear faces and being connected to said body portion by a vertical portion.

19. In a stretcher-frame, the combination of side-rail sections formed in channel shape from sheet metal, and means on the end of one of the rail-sections for fitting within and around the end of the other rail-section to hold the same together.

20. In a stretcher-frame, the combination of side-rail sections formed in channel shape from sheet metal, and two extensions on the end of one of said rail-sections formed in channel shape from sheet metal one fitting within the end of the other rail-section and the other over the same for holding said sections together.

21. In a stretcher-frame, the combination of side-rail sections formed in channel shape from sheet metal, two extensions on the end of one of said rail-sections formed in channel shape from sheet metal one fitting within the end of the other rail-section and the other over the same for holding said sections together, and means for fitting over one of said extensions and said other rail-section for securing the same in place.

22. In a stretcher-frame, the combination of side-rail sections formed in channel shape from sheet metal, two extensions on the end of one of said rail-sections formed in channel shape from sheet metal one fitting within the end of the other rail-section and the other over the same for holding said sections together, and a clamping-piece formed in channel shape from sheet metal and fitting over the outer one of said extensions and said other rail-sections for securing the same in place.

23. In a stretcher-frame, the combination of side-rail sections formed in channel shape from sheet metal, two extensions on the end of one of said sections formed in channel shape from sheet metal one fitting within the end of the other rail-section and the other over the same for holding said rail-sections together, a clamping-piece formed in channel shape from sheet metal and fitting over the outer one of said extensions and said other rail-section, and bolts passing through said extensions, clamping-piece and said other rail-section for securing the same in place.

24. In a stretcher-frame, the combination of side-rail sections formed in channel shape from sheet metal, two extensions on the end of one of said rail-sections formed in channel shape from sheet metal and provided with slots in the body thereof, one of said extensions fitting within the end of the other rail-section and the other over the same for holding said sections together, a clamping-piece formed in channel shape from sheet metal and fitting over the outer one of said extensions and said other rail-section, and bolts passing through the slots in said extensions, clamping-piece and said other rail-section for securing the same in place.

In testimony whereof I, the said HENRY ADLER, have hereunto set my hand.

HENRY ADLER.

Witnesses:
J. N. COOKE,
R. H. AXTHELM.